(12) United States Patent
Seymour

(10) Patent No.: US 6,834,747 B2
(45) Date of Patent: Dec. 28, 2004

(54) VARIABLE LEVERAGE 'V' TYPE BICYCLE BRAKE

(76) Inventor: Robert J. Seymour, 37 Bunbury Way, Epsom, Surrey, KT17 4JP (GB)

( * ) Notice: Subject to any disclaimer, the term of this patent is extended or adjusted under 35 U.S.C. 154(b) by 0 days.

(21) Appl. No.: 10/437,249

(22) Filed: May 14, 2003

(65) Prior Publication Data

US 2004/0173419 A1 Sep. 9, 2004

(30) Foreign Application Priority Data

Mar. 4, 2003 (TW) ........................................ 92203548 U

(51) Int. Cl.[7] ................................................. B62L 3/00
(52) U.S. Cl. ................................ 188/24.21; 188/24.12; 188/24.22; 188/20
(58) Field of Search ........................... 188/24.12, 24.21, 188/20, 24.11, 24.22, 24.14, 24.19, 24.15; 74/502.6

(56) References Cited

U.S. PATENT DOCUMENTS

| | | | | |
|---|---|---|---|---|
| 5,103,938 A | * | 4/1992 | Yoshigai | 188/24.22 |
| 5,704,453 A | * | 1/1998 | Tsai | 188/24.21 |
| 5,775,466 A | * | 7/1998 | Banyas et al. | 188/24.21 |
| 5,896,956 A | * | 4/1999 | Lin et al. | 188/24.22 |
| 6,032,766 A | * | 3/2000 | Yang | 188/24.19 |

* cited by examiner

*Primary Examiner*—Matthew C. Graham
*Assistant Examiner*—Mariano Sy
(74) *Attorney, Agent, or Firm*—Troxell Law Office PLLC

(57) ABSTRACT

This invention provides one variable leverage V type bicycle brake which includes two swinging arms, two friction bodies, one cable connection part, one brake cable and one adjusting device. One end of each of the two swinging arms is set on the bicycle frame and the other ends of the two arms is set with one swinging arm connection part respectively. Each one of the friction bodies is set at the central section of each swinging arm and one end of the cable connection part is connected to one of the swinging arm connections. One end of the brake cable penetrates the other end of the connection part by connecting to another swinging arm connection, the other end of the brake cable is connected to one brake lever set on the bicycle handlebar, and the adjusting device is set on each swinging arm, so as to vary the direction and position of the swinging arm connection part on the long shaft of the swinging arm to provide a variable leverage with the V type bicycle brake.

8 Claims, 6 Drawing Sheets

VARIABLE LEVERAGE 'V' TYPE BICYCLE BRAKE

FIELD OF THE INVENTION

The present invention relates to the bicycle brake device, and more particularly to one variable leverage 'V' type bicycle brake.

BACKGROUND OF THE INVENTION

For conventional brake device of a bicycle, each handlebar is set with one first lever device as there is one second lever device (i.e. one brake) set on the frame which is close to the wheel rim, while there connects one cable between the two lever devices with the first one linking up the second one through a cable and the second one controlling one friction body (piece) which can clamp the wheel rim or not so as to achieve an effect to reduce the speed or make a stop.

The preceding second lever device (brake) comprises one pair of arms and two friction bodies with each one set on each arm, while one end of each arm is connected to the bicycle frame to form one fulcrum and the other end of each arm is connected to the cable and is pulled or released by it that makes the friction body touch or not touch the wheel rim, consequently resulting in a labor-saving or effort-strenuous result for the second lever device. There are different designs of shape for each arm and different methods of connection for the cable that, in a word, would affect the arrangement method of the first lever device; for the second lever device (brake) currently available on market, there are 'V' type brakes and Cantilever type brakes.

Refer to FIG. 1, it is one conventional V-brake comprising one pair of arms (91) and two friction bodies (92) with each one set on each arm (91), as one end of each arm (91) is connected to the bicycle frame (93) to form one fulcrum (94) and the other end of each arm (91) is connected to the cable (95) and is pulled or released by it (95), while there comes no any variation for the connection of each arm (91) to the cable (95). In a word, the arms of application are invariable, that means the magnitude of leverage is invariable and has no free degree of leverage in response to the mode of the first lever device.

SUMMARY OF THE INVENTION

The primary objective of the present invention is to provide one variable leverage 'V' type bicycle brake that can vary the magnitude of arms of application and consequently vary the leverage of the brake.

The secondary objective of the present invention aims to provide one variable leverage 'V' type bicycle brake with a better degree of leverage in response to the lever device which is set on the handlebar of the bicycle.

To achieve the preceding objectives, the present invention provides one variable leverage 'V' type bicycle brake which consists of two swinging arms, two friction bodies, one cable connection part, one brake cable and one adjusting device while each one end of the two swinging arms is set on one bicycle frame relatively, each other end of the two arms is set with one swinging arm connection part respectively, each one of friction bodies is set at the central section of each swinging arm, one end of the cable connection part is connected to one of swinging arm connection part, one end of the brake cable penetrates through another end of the cable connection by connecting to another one swinging arm connection part, the other end of the brake cable is connected to one brake handlebar set on the bicycle handlebar, and the adjusting device is set on each swinging arm so as to vary the direction and position of swinging arm connection part on the long shaft of swinging arm.

The present invention can be understood through the following description and accompanying drawings wherein:

DETAILED DESCRIPTION OF THE INVENTION

Figure 1:
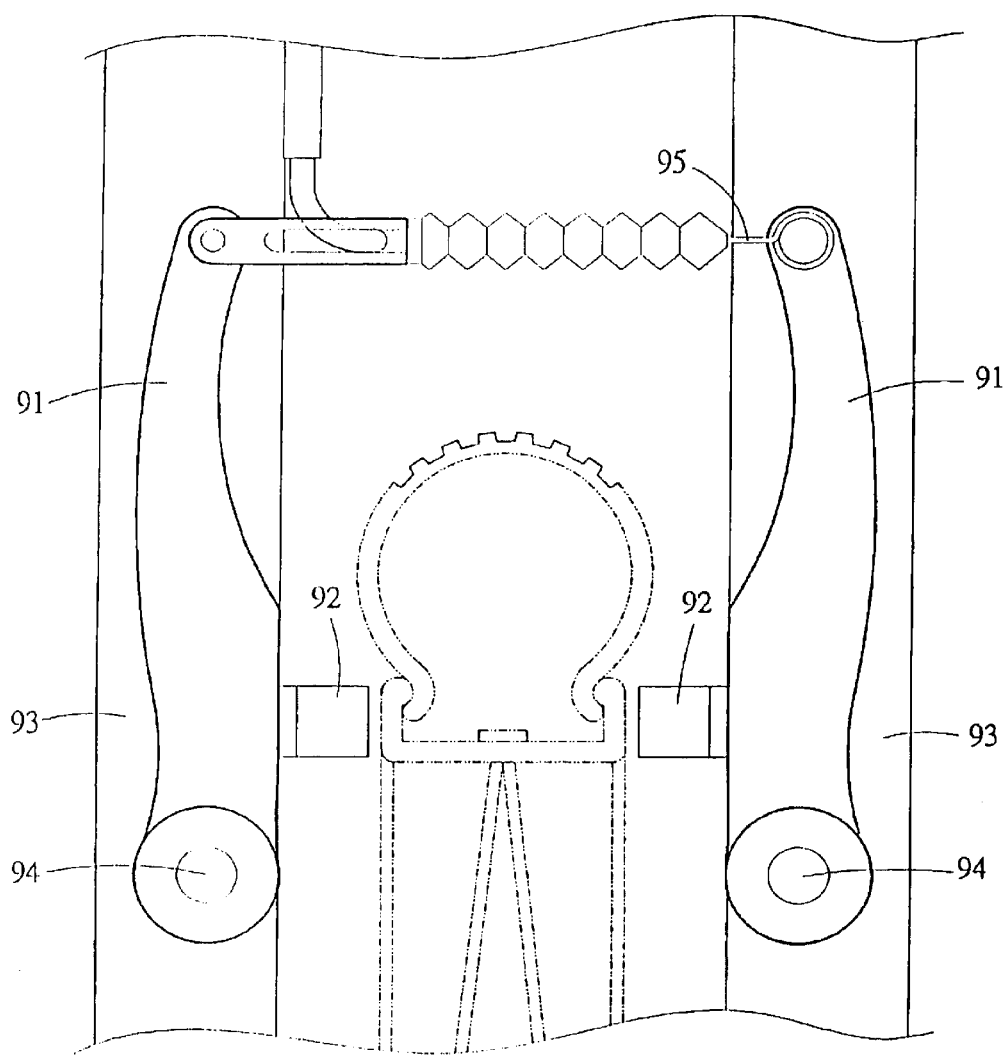
FIG. 1 is a side view of a conventional 'V' type bicycle brake.
Figure 2:
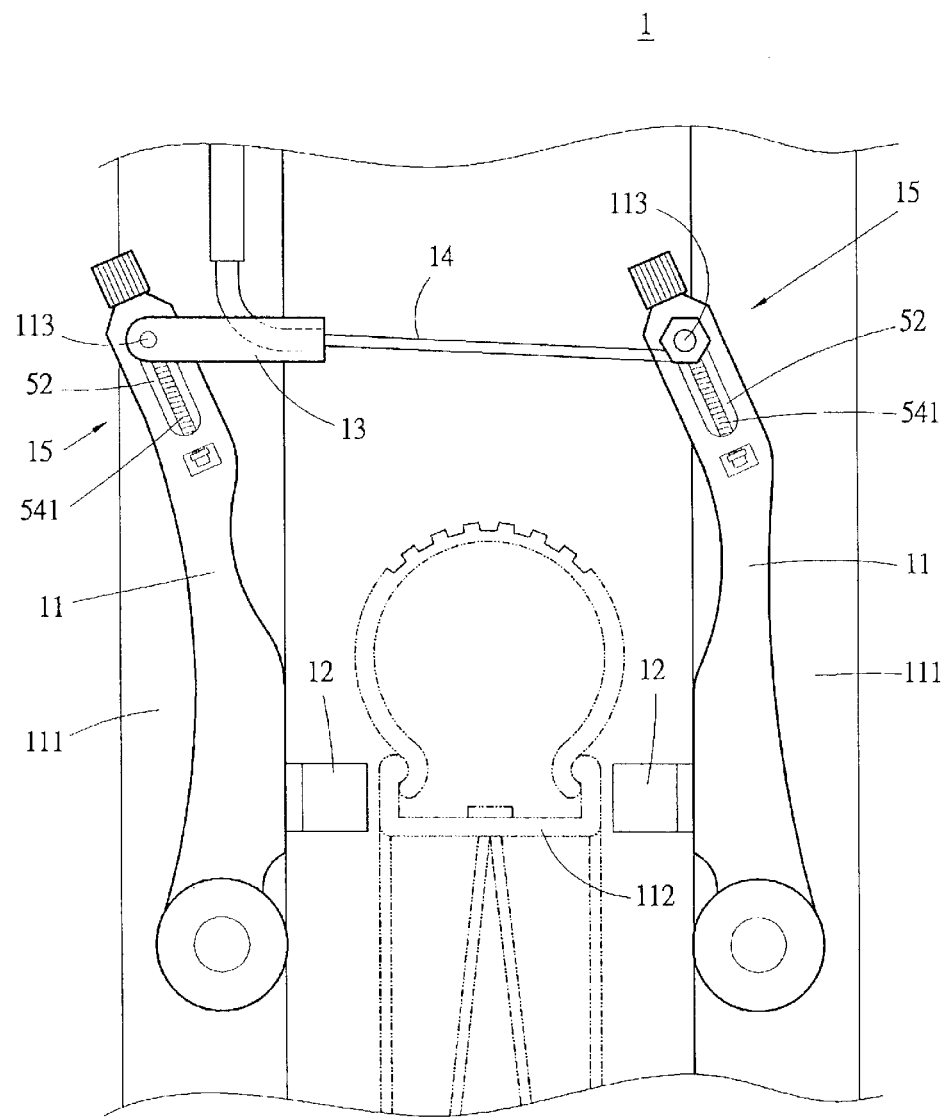
FIG. 2 is a side view of a first embodiment of the present invention.
Figure 3:
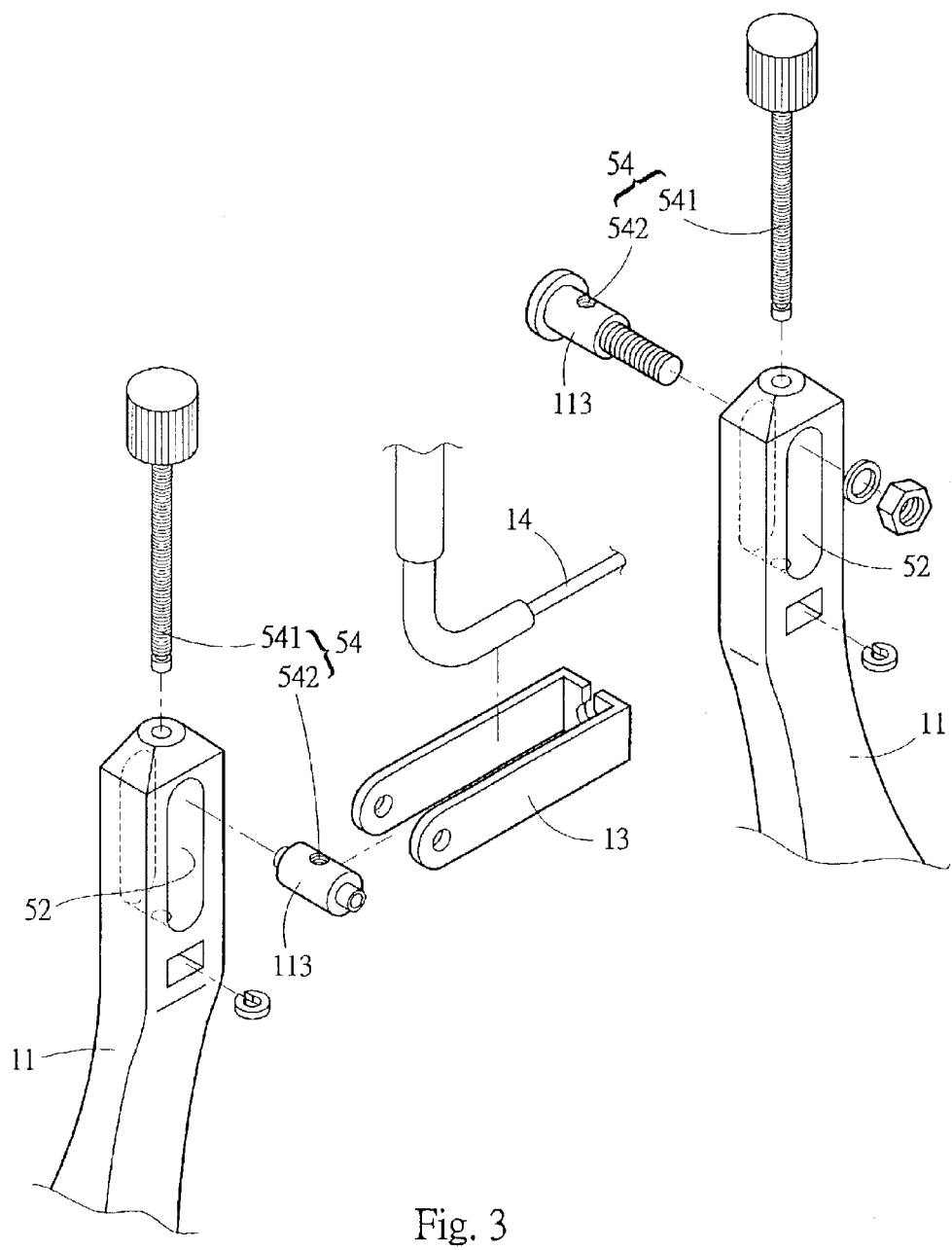
FIG. 3 is a partial perspective exploded view of the first embodiment of the present invention.

As shown in FIGS. 2 & 3 for the variable leverage 'V' type bicycle brake (1) provided by the present invention, it comprises two swinging arms (11), two friction bodies (12), one cable connection part (13), one brake cable (14) and one adjusting device (15).

Each one end of the two swinging arms (11) is set on the bicycle frame (111) relatively that is adjacent to the wheel rim (112), while each other end of the two arms (11) is set with one swinging arm connection part (113) respectively.

Each one of the two friction bodies (12) is set at the central section of each swinging arm (11), while each one swinging arm works to rub the wheel rim (112) while being swung.

One end of the cable connection part (13) is connected to one of swinging arm connection parts (113).

One end of the brake cable (14) penetrates through another end of the cable connection part (13) by connecting to another one swinging arm connection part (113), the other end of the brake cable (14) is connected to one hand lever (not shown on the figure) set on the bicycle handlebar.

The adjusting device (15) is set on each swinging arm (11) so as to vary the direction and position of swinging arm connection part (113) on the long shaft of swinging arm (11); the adjusting device (15) comprises one capacitive slot (52) and one caging part (54).

The capacitive slot (52) is formed by one long-shaped hole with both sides set relatively in the long shaft direction that penetrates the swinging arm (11), working to capacitate the swinging arm connection part (113).

The caging part (54) consists of one screw rod (541) and one tapped hole (542) penetrating the swinging arm connection part (113), while the screw rod (541) can be penetrated into the capacitive slot (52) in rotation that is set in a relative long shaft direction of the swinging arm (11) as well as be penetrated into the tapped hole (542) and make a connection.

Through the preceding structures, users can rotate the screw rod (541) and further link up the swinging arm connection part (113) to be moved forward and backward inside the capacitive slot (52) in a purpose of varying the magnitude of the arms of application that would further vary the leverage of the brake.

Figure 4:
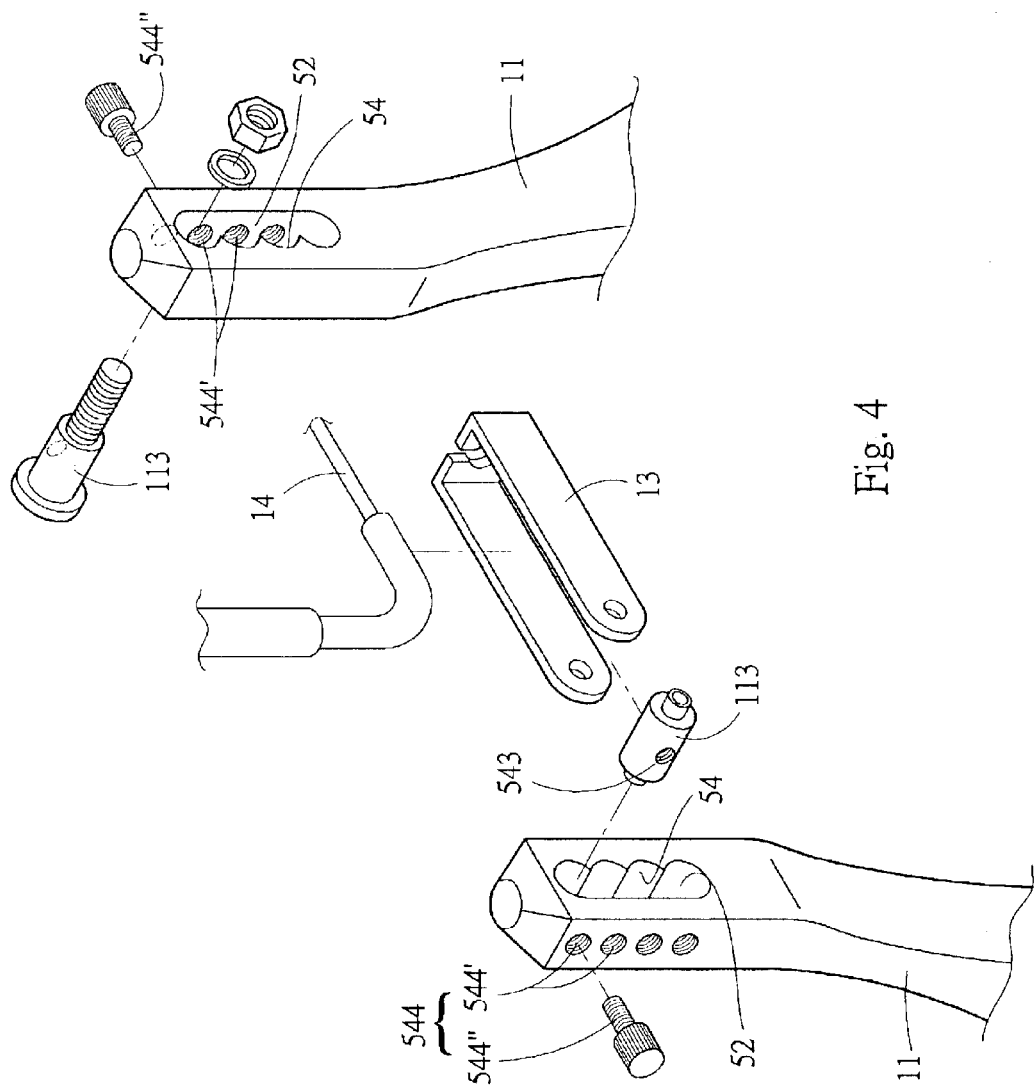
FIG. 4 is a partial perspective exploded view of a second embodiment of the present invention.

Refer to FIG. 4 for the preceding structure of the present invention, the caging part (54) is formed from the wave-like surface set on one inner wall which is close to the wheel rim (112) inside the capacitive slot (52) in the short shaft direction, so as to position the swinging arm connection part (113) to different position; furthermore, it consists of one first connection part (543) and one second connection part (544) while the first connection part (543) is set on the swinging arm connection part (113) which can be set as one tapped hole or cavity with appropriate depth, and the second connection part (544) includes some penetrating tapped holes (544') which are set relatively to the swing arm connection part (113) on one side in the caging part (54) of the swing arm (11) as well as one screw rod (544") which can connect and penetrate each tapped hole (544'), and one end of the screw rod (544") is connected to the first connection part (543) to actually position the connection part (113) to the swinging arm; another method of embodiment is to vary the tapping (544') as one long-shaped tapping which is set on one side (that is one side of the swing arm (11) of the swing arm (11) closer to the wheel rim (112)) of the swinging arm (11) set relatively to the caging part (54) and the first connection part (543) is set with one tapped hole with the screw rod (544") penetrating through the long-shaped tapping, while one end of the screw rod (544") is connected to the first connection part (543) and the other end of the screw rod (544") is connected to the side of the swinging arm (11) that can also achieve an objective to actually position the swinging arm connection part (113).

Figure 5:
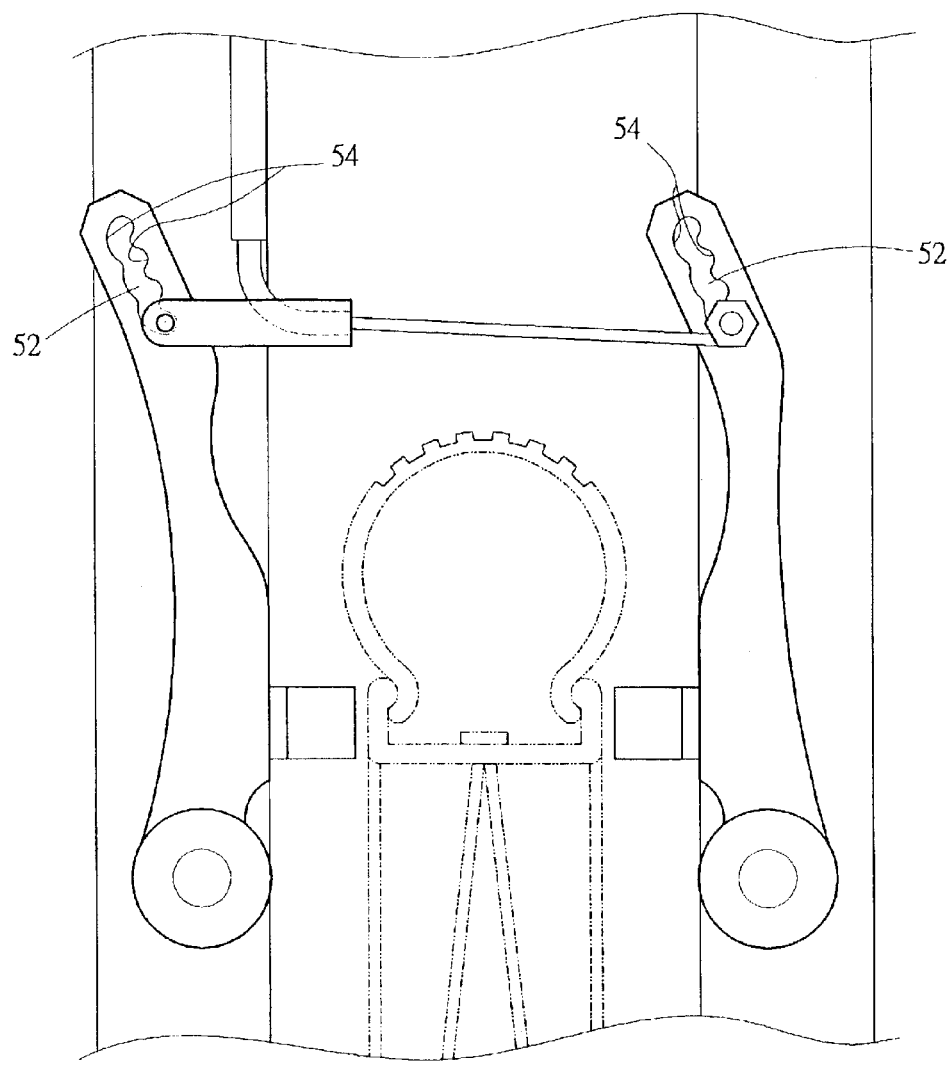
FIG. 5 is a side view of a third embodiment of the present invention.

Refer to FIG. 5 for the preceding structure of the present invention, the caging part (54) is formed from wave-like surface on the two inner walls inside the capacitive slot (52) in the short shaft direction.

Figure 6:
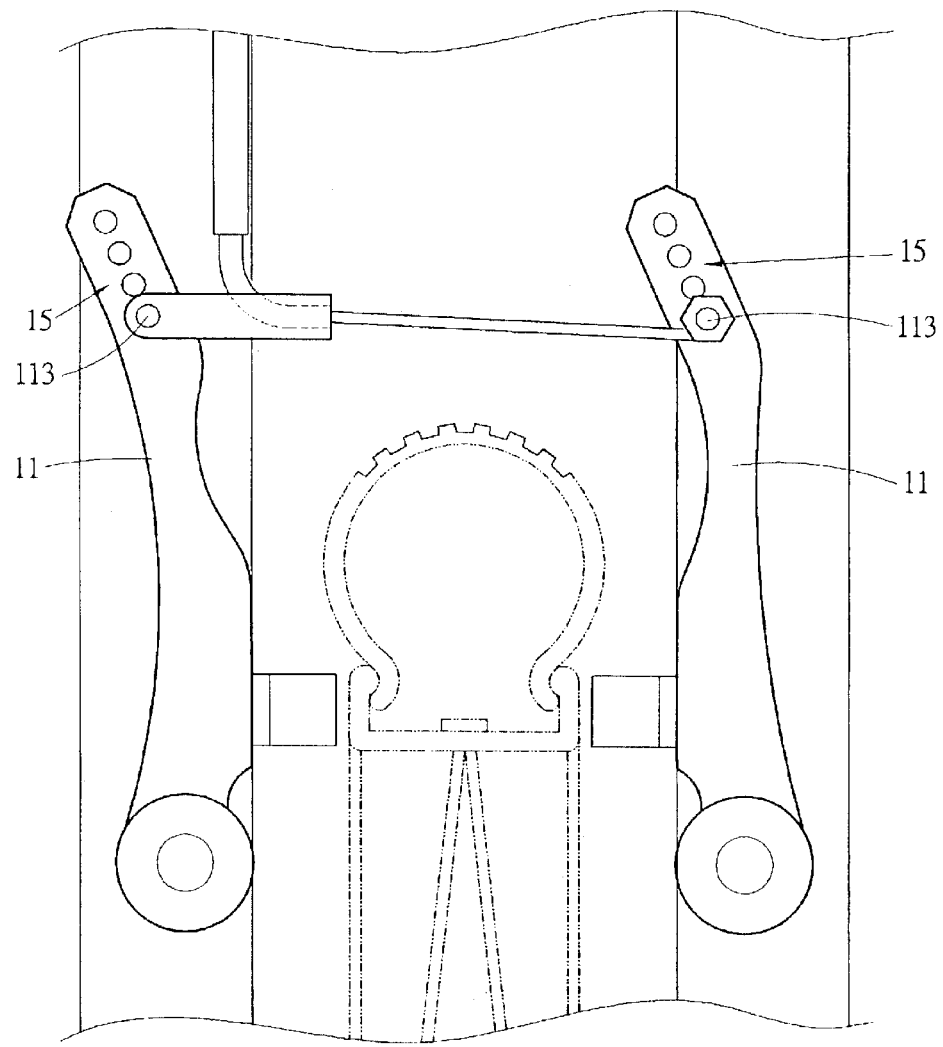
FIG. 6 is a side view of a fourth embodiment of the present invention.

Refer to FIG. 6 for the preceding structure of the present invention, the adjusting device (15) is formed from some distance-aligned tapping on both sides set relatively in the long shaft position that penetrates the swinging arm (11), also helping achieve the objective of the present invention.

What is claimed is:

1. A variable leverage V type bicycle brake comprising: two swinging arms with one end of each arm set on one bicycle frame relatively to be adjacent to a bicycle wheel rim, while the other end of each arm is set with one swinging arm connection part; two friction bodies with each one to be set at a center section of the swinging arm to rub the bicycle wheel rim when the swinging arms are swung; one cable connection part with one end to be connected to one of swinging arm connection part; one brake cable with one end penetrating the other end of the cable connection part to be connected to the other swinging arm connection part, while the other end of the brake cable to be connected to one brake handlebar set on a bicycle handlebar; one adjusting device set on each swinging arm to vary the direction and position of the swinging arm connection part on a long shaft of the swinging arm, wherein the adjusting device comprises: one capacitive slot formed by one long-shaped tapping with both sides in a bicycle long shaft direction that penetrating the swinging arm, working to capacitive the swinging arm connection part; one caging part comprising one screw rod and one tapped hole penetrating the swinging arm connection part, while the screw rod to be penetrated into the capacitive slot in rotation to be set relatively in a long shaft position to the swinging arm as well as into the tapped hole to make a connection.

2. A variable leverage V type bicycle brake comprising: two swinging arms with one end of each arm set on one bicycle frame relatively to be adjacent to a bicycle wheel rim, while the other end of each arm is set with one swinging arm connection part; two friction bodies with each one to be set at a center section of the swinging arm to rub the bicycle wheel rim when the swinging arms are swung; one cable connection part with one end to be connected to one of swinging arm connection part; one brake cable with one end penetrating the other end of the cable connection part to be connected to the other swinging arm connection part, while the other end of the brake cable to be connected to one brake handlebar set on a bicycle handlebar; one adjusting device set on each swinging arm to vary the direction and position of the swinging arm connection part on a long shaft of the swinging arm, wherein the adjusting device comprises: one capacitive slot formed by one long-shaped tapping with both sides in a bicycle long shaft direction that penetrating the swinging arm, working to capacitate the swinging arm connection part; one caging part to be formed from wave-like surface on one inner wall to be closer to the wheel rim inside the capacitive slot in a short shaft direction, so as to position a swinging arm connection in a different position.

3. The variable leverage V type bicycle brake as defined in claim 2, wherein the caging part further comprises the wave-like surface on one inner wall of the capacitive slot in a short shaft direction.

4. The variable leverage V type bicycle brake as defined in claim 2, wherein the caging part further comprises one first connection part and one second connection part; the first connection part set on the swinging arm connection part; the second we connection part covering some penetrating tapped holes set on one side of the swinging arm to be in corresponding to the swinging arm connection part, while the one side of the swinging arm to be set relatively to the caging part as well as one screw rod penetrating each tapped hole, while one end of the screw rod to be connected to the first connection part.

5. The variable leverage V type bicycle brake as defined in claim 4, wherein the first connection part is a cavity with appropriate depth.

6. The variable leverage V type bicycle brake as defined in claim 4, wherein the first connection part is the tapped hole with appropriate depth.

7. The variable leverage V type bicycle brake as defined in claim 2 wherein the caging part comprises one first connection part and one second connection part; while the first connection part to be a tapped hole set on the swinging arm connection part; the second connection part covering one long-shaped tapping set on one side of the swinging arm set to be in corresponding to the caging part as well as one screw rod penetrating the long-shaped tapping set, while one end of the screw rod connected to the first connection part and the other end of the screw rod to be connected to the side of the swinging arm.

8. A variable leverage V type bicycle brake comprising: two swinging arms with one end of each arm set on one bicycle frame relatively to be adjacent to a bicycle wheel rim, while the other end of each arm is set with one swinging arm connection part; two friction bodies with each one to be set at a center section of the swinging arm to rub the bicycle wheel rim when the swinging arms are swung; one cable connection part with one end to be connected to one of swinging arm connection part; one brake cable with one end penetrating the other end of the cable connection part to be connected to the other swinging arm connection part, while the other end of the brake cable to be connected to one brake handlebar set on a bicycle handlebar; one adjusting device set on each swinging arm to vary the direction and position of the swinging arm connection part on a on a shaft of the swinging arm, wherein the adjusting device is formed from some distance-aligned tapping penetrating the swinging arm on both sides set relatively in a long shaft position of the bicycle.

* * * * *